March 20, 1956  R. D. WAITE ET AL  2,739,306
DIFFERENTIAL GAUGE IN SYNCHRO TRANSMITTER SEALED CASE
Filed Sept. 12, 1951  3 Sheets-Sheet 1

*INVENTORS*
RALPH D. WAITE
PHILIP W HARLAND

BY

ATTORNEY

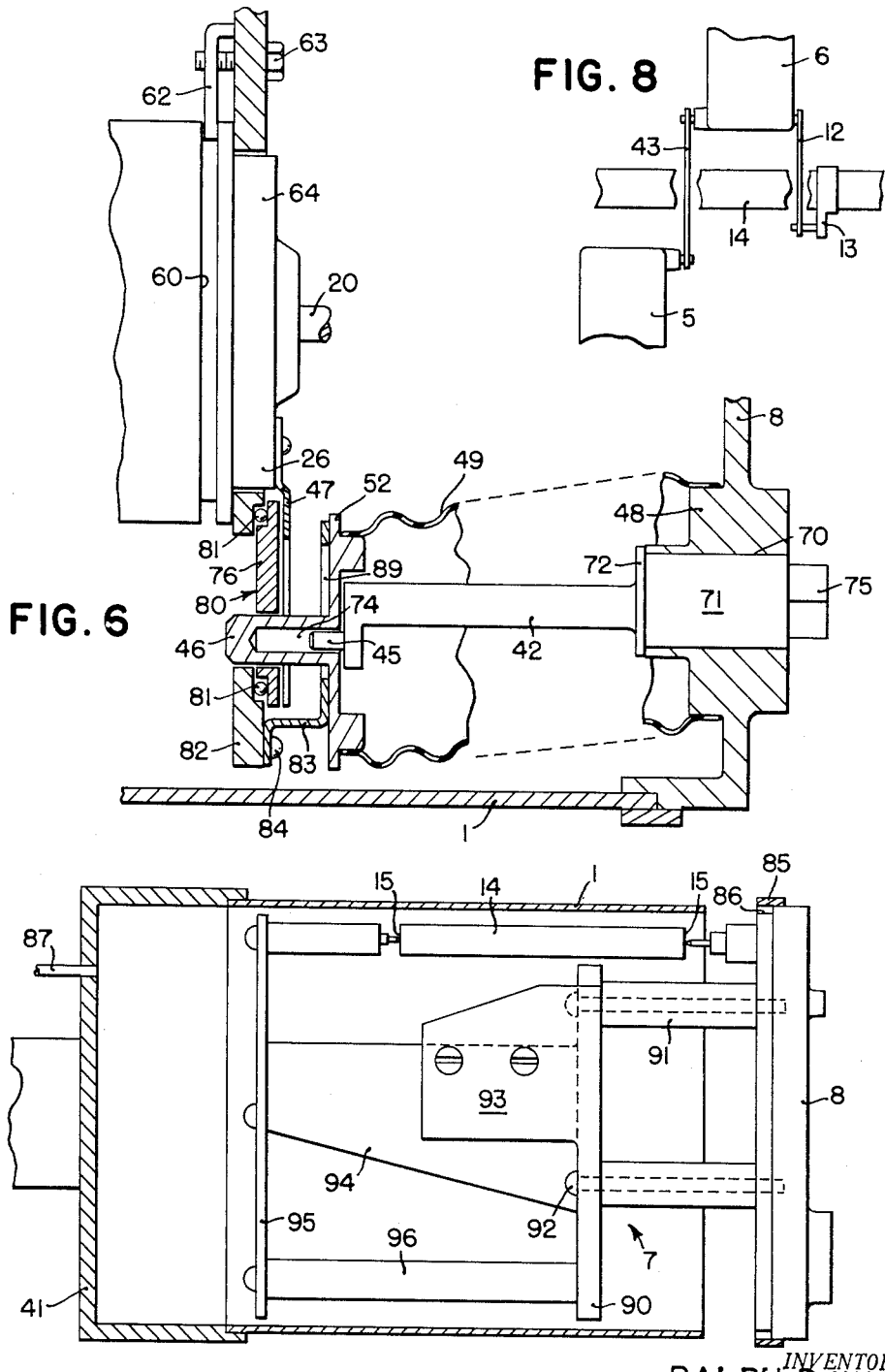

United States Patent Office 2,739,306
Patented Mar. 20, 1956

2,739,306

DIFFERENTIAL GAUGE IN SYNCHRO TRANSMITTER SEALED CASE

Ralph D. Waite and Philip W. Harland, Sellersville, Pa., assignors to American Machine and Metals, Inc., New York, N. Y., a corporation of Delaware Application September 12, 1951, Serial No. 246,278

12 Claims. (Cl. 340—345)

This invention relates to instruments and particularly to one for measuring the difference between two pressures for operating a synchro-transmitter to produce an electric signal useful at a remotely located point, the mechanism preferably being completely sealed in an inert atmosphere.

One of the objects of the invention is to provide an improved pressure differential measuring instrument.

A further object of the invention is to provide a hermetically sealed instrument which can be adjusted with ease.

A still further object of the invention is to provide an instrument which will not be affected by ambient temperature and pressure.

The synchro-unit of the synchro-transmitter can take the form of a conventional three phase stator winding and a rotor, the rotor being connected to an alternating current source. Any suitable synchro receiving unit can be connected to the synchro-transmitter.

In a preferred form, the instrument case is hermetically sealed and the relative position of interior parts can be adjusted so that the intensity of the currents in the several phases of the synchro-transmitter stator windings will be of such relative intensity that the pointer will register the pressure measured correctly on the distant scale. More specifically, by moving some of the parts relative to others inside of the case, the zero position of the pointer on the distant indicator can be adjusted to agree with the scale.

In one aspect, two Bourdon tubes of similar size and characteristics can be arranged in parallel planes so that they are opposed to each other, one of the Bourdon tubes being connected to the pressure which is to be measured and the other Bourdon tube being responsive to the pressure outside of the case.

The synchro unit at the transmitting station is located within the arcs of the Bourdon tubes which transmit their motion to the rotor which is rotated in proportion to the change in the differential of the pressures in the tubes.

Since the two tubes are opposed, one measuring the ambient pressure and the other the pressure to be measured, the effect of the pressure of the inert gas in the case on the two Bourdon tubes is eliminated. The effect of temperature on the inert gas within the housing which may cause a rise of pressure within that housing is likewise eliminated because the increased pressure will act equally on each of the two opposed Bourdon tubes. The first Bourdon tube also could be connected to any pressure desired to be compared with the pressure exerted on the second Bourdon tube.

Another feature of the invention resides in mounting on a single casting the two Bourdon tubes, the rock shaft, and also the synchro-unit, the synchro-unit being mounted in such a manner that its angular position can be modified from outside the sealed container without breaking the seal. This aspect can be accomplished by employing a bellows which extends into the housing, the bellows being sealed to the housing at an opening therein and being closed at its inner end. The inner end of this bellows can be moved laterally so that the position of the stator of the synchro-unit can be moved angularly relative to the housing and the rotor.

The invention is particularly designed for use in connection with airplanes where a pressure is to be measured at a point remote from the panel in the pilot's cabin, the electrical signal from the synchro-transmitter being employed to actuate a pointer on said panel. Such an instrument must be compact, not subject to injury by violent acceleration, and such an instrument should be sealed in an inert atmosphere to preserve its accuracy.

These and other objects, advantages and features of the invention will become apparent from the following description and drawings.

In the drawings:

Fig. 6 is a section taken on line 6—6 of Fig. 4 drawn to a larger scale than the rest of the figures.

Fig. 7 is an elevation of the main supporting structure with the operating parts omitted and the casing parts partly separated.

Fig. 8 is a fractional view taken along line 8—8 of Fig. 3.

Figure 1:
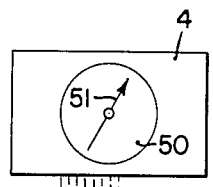
Fig. 1 is a view of the transmitter in side elevation.
Figure 1:
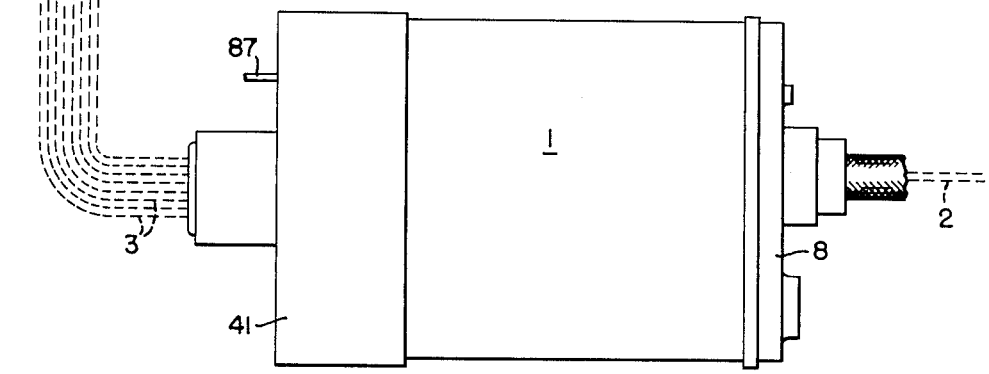

As shown in Fig. 1, the transmitter is designed to receive the pressure to be measured from some outside system through a tube 2 and to measure this pressure by the apparatus located in the transmitter which is to be described and then to transmit an electric signal through leads 3 to a distant receiver 4 which contains a synchro unit that actuates a pointer 51 to indicate on dial 50 the difference of pressure existing in line 2 and in the space around the transmitter.

Figure 2:
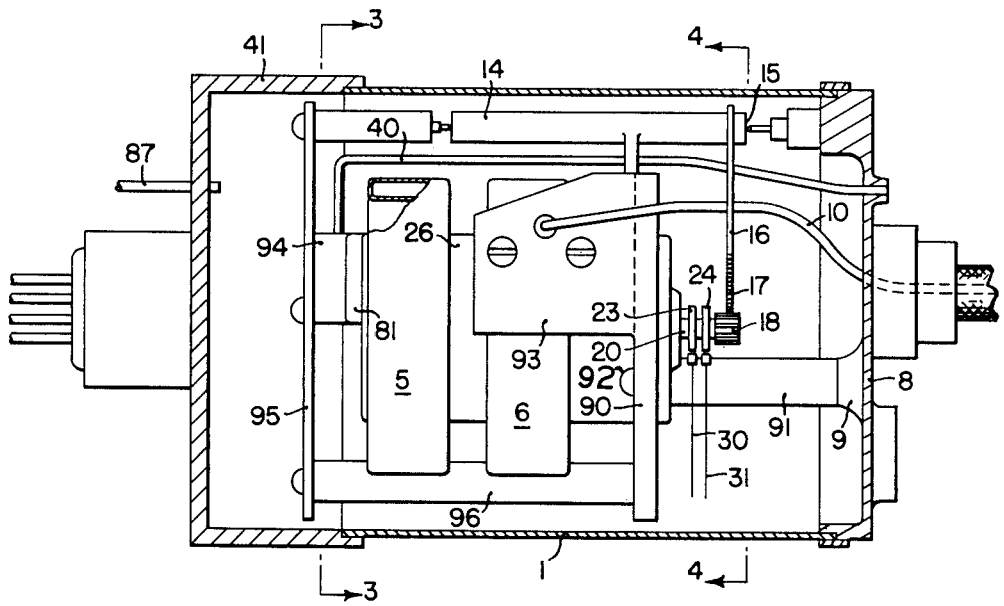
Fig. 2 is an elevation taken in the direction 2—2 of Fig. 4 of the contents of the transmitter housing with the housing in section and some parts omitted for clarity.

As shown in Fig. 2, the transmitter consists of a cylindrical body 1 having end heads 8 and 41. After the device is completely assembled, the body is soldered or otherwise sealed to the end heads so that the space within is completely isolated. This space may be filled with an inert gas. To facilitate assembly and to prevent the instruments being subject to strain as a result of either the expansion of the housing or of outside stresses, all of the instruments are mounted on a chassis 7 which is attached to the end head 8.

The parts of the device are all supported on chassis 7 (Fig. 7) which comprises a mounting plate 90 which has outwardly extending hollow legs 91. Screws 92 extending through these legs permit attaching the chassis to bosses 9 (Fig. 2) on cap 8. In this manner, holes through the cap are eliminated, said holes being possible leakage paths. Abutment 93 extends from the plate 90 and a somewhat similar abutment 94 is mounted on the plate 90 behind abutment 93, the upper end of this being visible in Fig. 2. These abutments support two Bourdon tubes 5, 6. An end plate 95 is attached by screws to the abutment 94 and to a spacer 96 rising from plate 90. End plate 95 serves as a guide for cylindrical shell 1 when the parts are being assembled so as to protect from injury the structures carried by the chassis as the shell slides into place.

The synchro-unit stator 26 is supported on plate 90, said stator in turn supporting the rotor having shaft 20.

Fig. 7 is a vertical section taken through the structural portion of the transmitter with the internal parts removed. The rim of casing 41 is bored out for the cylindrical shell 1 which is attached to it. The cap 8 is turned down at 86 so that the shell 1 will fit snugly over the cap 8. A tube 87 extends through the cap 41. After the unit is assembled, a band 85 may be soldered over the end between the shell 1 and the cap 8 to hermetically seal the housing. The shell can now be evacuated through the tube 87, and if desired, an inert gas may be allowed to flow through 87 into the space 88.

The abutment 93 supports a base 80 (Fig. 3) to which one end of the Bourdon tube 6 is attached and the pressure to be measured is transmitted from the tube 2 through line 10 to this base 80 and from there passed into the Bourdon tube 6.

Figure 3:
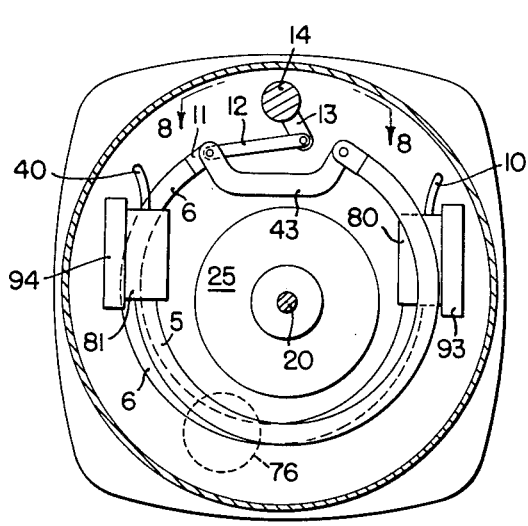
Fig. 3 is a vertical cross section taken on line 3—3 of Fig. 2.
Figure 4:
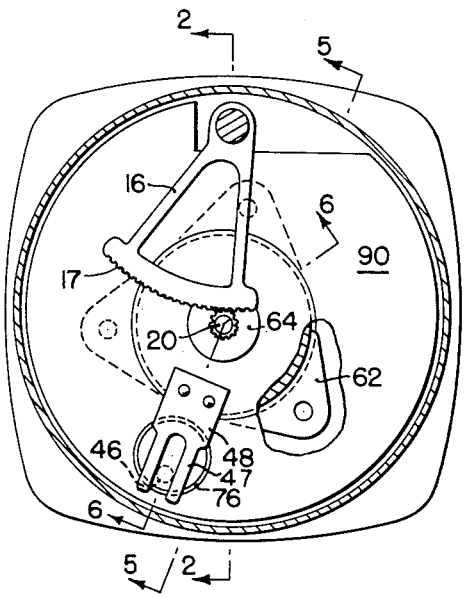
Fig. 4 is a vertical cross section taken on line 4—4 of Fig. 2.
Figure 5:
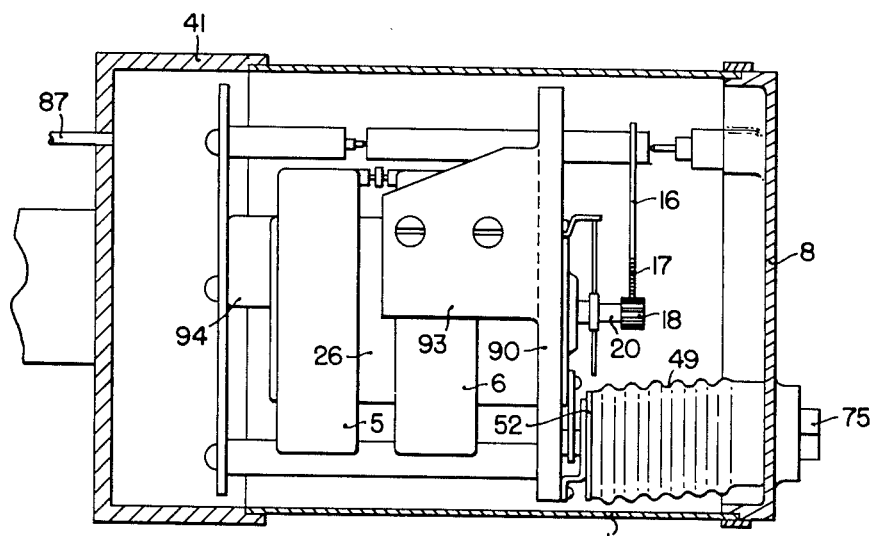
Fig. 5 is an elevation taken in the direction 5—5 of Fig. 4 of the contents of the housing, similar to Fig. 2 but with more parts shown.

The other abutment 94, as seen in Figs. 4, 5, is located behind the abutment 93 and the stator of the synchro-unit, abutment 94 carrying a base 81 for the Bourdon tube 5. Base 81 supports the tube 5 which is approximately the same in size as the tube 6 and is located in a plane parallel thereto. As seen in Fig. 3, the tube 5 begins at the base 81 on abutment 94 and extends counter-clockwise over the top of the base 80 of tube 6 and its end is connected by a connecting link 43 with the end of the Bourdon tube 6 which is located directly behind the tube 5, and which begins at 80 and extends clockwise under the overhanging base 81 to the end 11 of Bourdon tube 6. The two free ends of the Bourdon tubes are thus connected by the link 43. A tube 40 extends from the base 81 where it connects with the Bourdon tube through a hole in the end 8 to which it is sealed. Thus, it connects to the pressure outside of the housing 1

Thus it will be seen that as the outside atmospheric pressure increases acting through the tube 40 and the Bourdon tube 5, it will seek to move the connecting link to the right in Fig. 3. The pressure to be measured as transmitted to the Bourdon tube 6 would tend to move the connecting link 43 to the left in Fig. 3 as it increases. The resultant differential motion of the two free ends will therefore be a measure of the differential pressure. The ends of one of the tubes is connected by a link 12 to the arm 13. This arm is carried by the rock shaft 14 and thus this rock shaft will move through a small angle proportionate to the differential pressure measured.

The movement of the shaft 14 is transmitted through the sector 16 having teeth 17 to the pinion 18 of the rotor of the synchro-unit 26, the stator casing also being supported on the casting 7. The rotor may carry collecting rings 23, 24 connected to two leads 30 and 31 in the usual manner. As the rotor turns, a signal in several phases will be generated which when transmitted to a suitable synchro-unit at the receiving end will actuate the pointer.

Since it is necessary to orient the relative position of the armature and the stator to provide an adjustment for the zero of the pointer, the external surface of the stator may be provided with a circular groove 60. One end of the stator may project through an aligning opening in the mounting plate 90 and a number of guide pieces 62 fastened by screws 63 to the casting 7 as shown in Fig. 5 may enter this groove 60. These guide pieces may be adjusted against the bottom of the groove to draw the stator against the mounting plate to give a frictional contact. Thus, it will be seen that the casing of the synchro-unit 26 is normally held in a fixed position but can be rotated about its axis against this frictional resistance for adjustment. To permit this rotation, the end 64 (Fig. 6) of the stator has extending fingers 47 forming a prong. It is obvious, that by moving this prong angularly, the position of the stator may be changed. In order to accomplish the result while keeping the housing 1 sealed, the cap 8 is bored at 70 and an eccentric shaft 42 having a widened portion 71 turning freely in the bore is provided. The widened portion 71 has the flange 72 to limit the endwise motion of the eccentric shaft in one direction. The eccentric shaft carries a pin 45. Soldered or otherwise attached to a flange 48 of the cap 8 is a bellows 49 the other end of which is closed by a disc 52. This disc has an extension or spud 46 and, in line with this spud is a recess 74 in the piece 52 and the pin 45 enters this recess. It will be seen that as the eccentric shaft 42 is turned by engaging a wrench with the square shank 75 the disc 52 is moved in the one plane but does not rotate about its own axis. It does however revolve about the axis of 71 so that the spud 46 describes a circle concentric with the bore 70.

It is desirable to prevent the shaft 42 from springing as it is turned by a wrench engaging the nut 75. Since the shaft must turn the stator 26 which is held frictionally by the clamps 62, an appreciable force must be exerted. To prevent the shaft from springing, the spud 46 is supported centrally in a disc 76 whose center 80 is in the projected axis of the bore 70. This disc 76 is free to turn on the spud 46 and also free to turn on the ball bearings 81 in a race in the deck 82 of the mounting plate 90. As the end 71 of shaft 42 rotates about its own axis in the bore 70, the opposite end 45 does two things. It rotates about its own axis, and it also revolves around the center of bore 70. The spud 46 revolves around the same center but does not rotate. The disc 76 rotates only about its own axis 80 which is also that of bore 70.

Since the bellows tend to exert an end thrust on the cap 40 which should not be carried against prongs 47, the thrust plate 83 is fastened to mounting plate 90 by screws 84. This thrust plate has a large opening 89 and the disc 52 slides thereon.

We claim:

1. In a device for the purpose described, a chassis, a Selsyn motor mounted on said chassis and having a stator rotatably shiftable on the chassis and a rotor provided with a shaft, an hermetically sealed casing enclosing said chassis and motor, means within said casing operating said rotor, means operable from the exterior of the casing for shifting the stator about its axis, said last named means including a flexible bag-like device extending inward from an opening in the wall of the casing and hermetically sealed thereto, a yoke extending radially from said stator, a pin eccentrically mounted on the inner end of the flexible bag-like device and engaging said yoke, and an eccentric shaft carried by the casing whose inner end engages the end of said bag-like device.

2. In a device for the purpose described, a chassis, a Selsyn motor mounted on said chassis and having a stator rotatably shiftable on the chassis and a rotor provided with a shaft, an hermetically sealed casing enclosing said chassis and motor, means within said casing operating said rotor, collector rings on said rotor shaft, and conductors leading from said rings and extending through the casing walls in hermetically sealed relation thereto, means operable from the exterior of the casing for shifting the stator about its axis, said last named means including a flexible bag-like device extending inward from an opening in the wall of the casing and hermetically sealed thereto, a yoke extending radially from said stator, and a pin eccentrically mounted on the inner end of the flexible bag-like device and engaging said yoke, and an eccentric shaft carried by the casing whose inner end engages the end of said bag-like device.

3. In a device for the purpose described, a chassis, a Selsyn motor mounted on said chassis and having a stator rotatably shiftable on the chassis and a rotor provided with a shaft, an hermetically sealed casing enclosing said chassis and motor, a pressure receiving Bourdon tube having one end fixed to said chassis and its other end free, a jack-shaft having a rock arm and journaled within said casing, a link within said casing connecting the free end of said tube with the rock arm, and gearing within the casing connecting the jack-shaft with the rotor shaft, means operable from the exterior of the casing for shifting the stator about its axis, said last means including a bellows-like structure closed at its inner end and having its outer end sealed against the inner face of the casing wall, a yoke extending radially from said stator, and a pin eccentrically mounted on the inner end of the flexible bag-like device and engaging said yoke, a shaft extending through an opening in the casing wall axially of the bellows-like structure and engaging the closed end of said bellows-like structure.

4. A device for angularly adjusting the position of a piece within a hermetically sealed casing comprising, an hermetically sealed casing, a piece rotatably mounted in said casing, an arm projecting radially from said piece, a shaft parallel to the axis of rotation of said piece extending into said casing, an eccentric pin carried by said shaft, a circular disc engaging said pin, a bellows whose ends are sealed respectively to the casing and to the edges of said circular disc, means carried by the disc engaging said arm.

5. A device for angularly adjusting the position of a piece within a hermetically sealed casing comprising, a hermetically sealed casing, a piece rotatably mounted in said casing, an arm projecting radially from said piece and having a radial slot, a shaft parallel to the axis of rotation of said piece extending into said casing, an eccentric pin carried by said shaft, a circular disc having a pocket engaging said pin, a bellows whose ends are sealed respectively to the casing and to said circular disc ends, a stud carried by the disc on the side opposite to that in which said pocket is located engaging said arm.

6. A synchro-transmitter unit comprising a hermetically sealed casing, a chassis insertable into said casing, said chassis having a platform mounted thereon, a synchro-unit whose rotor is mounted on said platform with its axis normal thereto, abutments extending from said platform, a Bourdon tube supported on one of said abutments parallel to said platform and encircling said rotor of said synchro-unit, a connection from said Bourdon tube hermetically sealed in said casing leading to the source of pressure to be measured, a second Bourdon tube supported on another abutment parallel to said first mentioned Bourdon tube and encircling said rotor in the opposite direction, a link in a plane between said Bourdon tubes joining their ends, a jack-shaft mounted on said platform parallel to the axis of the rotor of said synchro-unit, a pinion carried by said rotor, a meshing gear carried by said jack-shaft, and means for transmitting motion from the free end of at least one of said Bourdon tubes to the jack-shaft.

7. In an electric signal producing instrument, the combination including a compact hermetically sealed casing, a synchro-unit within said housing and having a rotor and stator, a first pressure responsive means in said casing, said first means being connected with a variable to be measured, a second pressure responsive means within said casing, said second means being connected with a second pressure, said pressure responsive means being movable in accordance with the pressure to which each respectively is subjected, differential connecting means operatively connecting the movable ends of said pressure responsive means, means connecting said differential connecting means with the rotor of said synchro-unit to move the same in accordance with the difference in pressure between said responsive means, and electrical connecting means extending through said casing for connecting said synchro-unit with a receiver.

8. In an electric signal producing instrument, the combination including a hermetically sealed casing, a chassis insertable into said casing and carried thereby, a synchro-unit within said housing and having a rotor and stator mounted on said chassis, a first pressure responsive means in said casing, and mounted on said chassis, said first means being connected with a variable to be measured, a second pressure responsive means within said casing and mounted on said chassis, said second means being connected with a second pressure, said pressure responsive means being movable in accordance with pressure to which each is subjected, differential connecting means operatively connecting said pressure responsive means, means connecting said differential connecting means with the rotor of said synchro-unit to move the same in accordance with the difference in pressure between said responsive means, and electrical connecting means for connecting said synchro-unit with a receiver.

9. In an electric signal producing instrument, the combination including a hermetically sealed casing, a chassis insertable into said casing, a synchro-unit within said housing and having a rotor and stator mounted on said chassis, a first Bourdon tube in said casing, said first tube being connected with a variable to be measured and being mounted on said chassis encircling said synchro-unit, a second Bourdon tube within said casing and mounted on said chassis and encircling said synchro-unit, said second tube being connected with a second pressure, differential connecting means operatively connecting the ends of said Bourdon tubes, means connecting said differential connecting means with the rotor of said syncho-unit to move the same in accordance with the difference in pressure between said Bourdon tubes, and electrical connecting means for connecting said synchro-unit with a receiver to give a signal in accordance with said difference in pressure.

10. In an electric signal producing instrument, the combination comprising a hermetically sealed casing, a synchro-unit within said casing and having a rotor and stator, said stator being rotatably adjustable in said casing, a first pressure responsive means in said casing, means connecting said first pressure responsive means with a variable to be measured, a second pressure responsive means in said casing, means connecting said second pressure responsive means with the exterior of said casing, differential connecting means between movable portions of said pressure responsive means, means connecting said differential connecting means with said rotor for operating the same, electrical connections from said synchro-unit, and sealed adjusting means extending exteriorly of said casing and connected to said stator for rotating said stator.

11. In an electric signal producing instrument, the combination comprising a hermetically sealed casing, a synchro-unit within said casing and having a rotor and stator, said stator being rotatably adjustable in said casing, a first pressure responsive means in said casing, means connecting said first pressure responsive means with a variable to be measured, a second pressure responsive means in said casing, means connecting said second pressure responsive means with the exterior of said casing, differential connecting means between movable portions of said pressure responsive means, means connecting said differential connecting means with said rotor for operating the same, electrical connections from said synchro-unit, an eccentric shaft means connecting said stator with the exterior of said casing and a bellows connected with said shaft means and said casing sealing the same.

12. In a synchro-transmitter or the like, the combination comprising a hermetically sealed casing, a synchro-unit within said casing and having a rotor and stator, said stator being rotatably shiftable in said casing, said rotor being provided with a shaft, a first pressure responsive means in said casing, means connecting said first pressure responsive means with a variable to be measured, a second pressure responsive means in said casing, means connecting said second pressure responsive means with a second pressure, differential connecting means between movable end portions of said pressure responsive means, means connecting said differential connecting means with said rotor for operating the same, electrical connections from said synchro-unit to the exterior of said casing for giving a signal in accordance with the difference in pressure between said pressure responsive means, and sealed adjusting means extending exteriorly of said casing and connected to said stator for rotating said stator in order to change the relative position of said stator to said rotor.

References Cited in the file of this patent

UNITED STATES PATENTS

| | | |
|---|---|---|
| 1,957,037 | Beck | May 1, 1934 |
| 2,403,256 | Beck | July 2, 1946 |
| 2,446,546 | Meston | Aug. 10, 1948 |
| 2,490,918 | Phillips | Dec. 13, 1949 |
| 2,639,616 | Tate | May 26, 1953 |